United States Patent [19]
Melas

[11] Patent Number: 6,084,924
[45] Date of Patent: Jul. 4, 2000

[54] ASYNCHRONOUS LOW SAMPLING RATE READ CHANNEL USING COMBINATION MIDPOINT AND LINEAR INTERPOLATION

[75] Inventor: Constantin Michael Melas, Los Gatos, Calif.

[73] Assignee: International Business Machines Corporation, Armonk, N.Y.

[21] Appl. No.: 09/042,121

[22] Filed: Mar. 13, 1998

[51] Int. Cl.[7] .............................. H03D 1/00; H03H 7/30; G11B 5/035
[52] U.S. Cl. ............................ 375/340; 375/232; 360/65
[58] Field of Search .................................. 375/232, 340, 375/341, 229, 316, 290; 360/40, 48, 65; 708/322, 323

[56] References Cited

U.S. PATENT DOCUMENTS

| | | | |
|---|---|---|---|
| 4,031,370 | 6/1977 | Catherall | 235/152 |
| 5,638,070 | 6/1997 | Kuwaoka | 341/95 |
| 5,949,695 | 9/1999 | Snell | 364/723 |

OTHER PUBLICATIONS

Melas et al., "An Asynchronous Fully Digital Channel for Magnetic Recording", *IEEE Globecom Conference Record*, 1994, pp. 1144–1147.
Oppenheim et al., "Discrete Time Signal Processing", *Prentice Hall, Inc.*, copyright 1989, p. 258.

*Primary Examiner*—Chi H. Pham
*Assistant Examiner*—Khai Tran
*Attorney, Agent, or Firm*—R. Bruce Brodie

[57] ABSTRACT

A method and apparatus for the recovery of information via asynchronous signal sampling of coded analog waveforms by double interpolating values into the train of asynchronously sampled signals prior to the train being applied to a synchronous detector. The double interpolation includes averaging successive sample signals and midpoint interpolating them between the sample, and then interpolating signals between the sample signals and midpoint signals closest to predicted synchronous points. This double interpolation facilitates low sampling rates while still effectuating accurate synchronous digital detection.

11 Claims, 4 Drawing Sheets

PARTIAL RESPONSE-CODED, TIME-VARYING WAVEFORM WITH ASYNCHRONOUS SAMPLING AND TWO LEVELS OF INTERPOLATION BEING SUPERIMPOSED

CONTROL AND DATA FLOW IN SCSI ATTACHED DASD

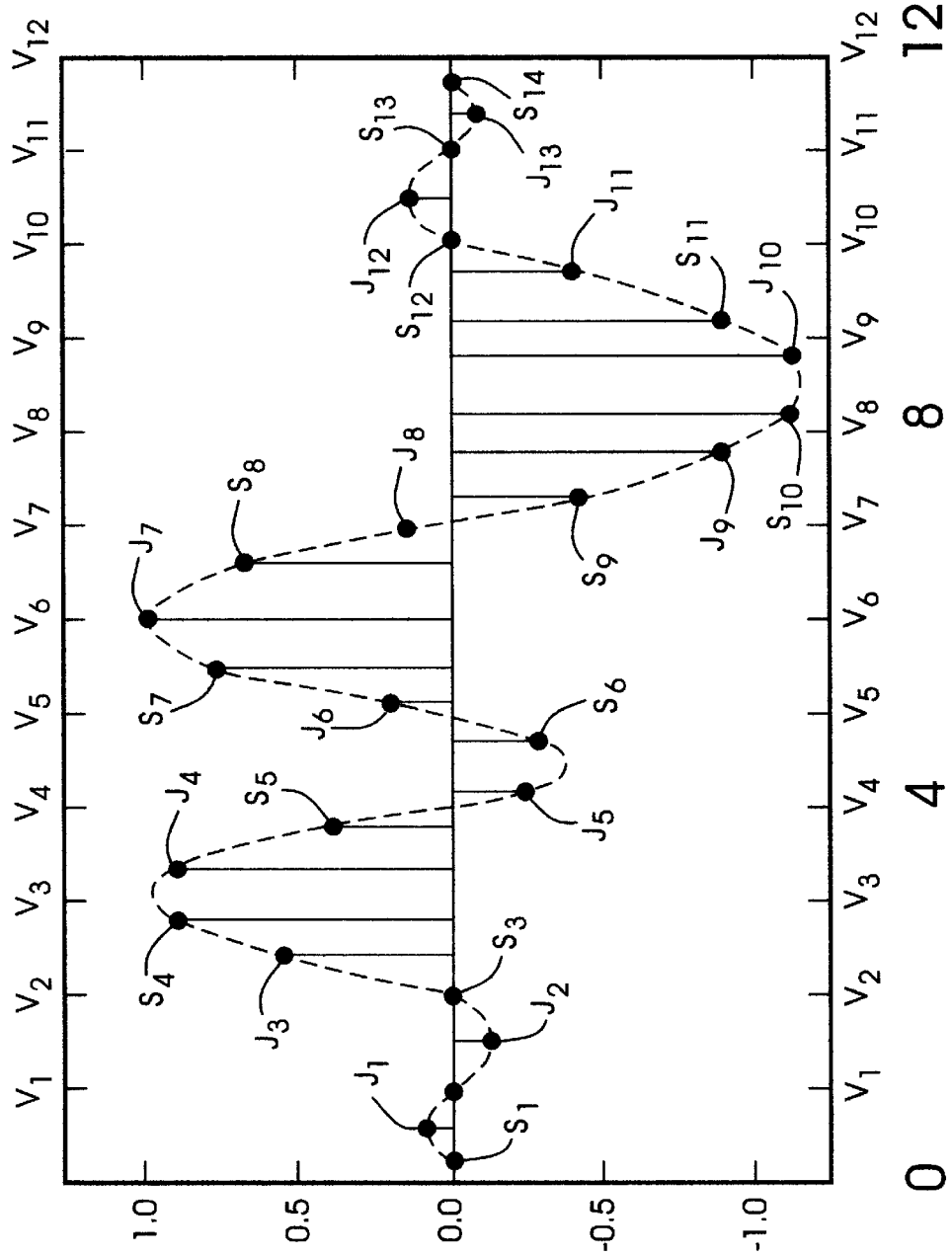
FIG. 4 PARTIAL RESPONSE-CODED, TIME-VARYING WAVEFORM WITH ASYNCHRONOUS SAMPLING AND TWO LEVELS OF INTERPOLATION BEING SUPERIMPOSED

ASYNCHRONOUS LOW SAMPLING RATE READ CHANNEL USING COMBINATION MIDPOINT AND LINEAR INTERPOLATION

FIELD OF THE INVENTION

This invention relates to the recovery of digital information impressed synchronously on an analog waveform via asynchronous signal sampling of waveforms as received from communication channels, tracked magnetic or optical storage devices, or the like. More particularly, the invention relates to interpolating signals between the asynchronously sampled signals at predetermined points in order to recover the synchronous sample amplitudes.

DESCRIPTION OF RELATED ART

It is well appreciated that coded signals are written onto a recording medium, such as tracked moving magnetic or optical storage, at a predetermined rate. Illustratively, synchronous sample amplitudes may assume the values of A, 0, and −A. To recover these samples requires an analog oscillator locked with the samples in phase and frequency.

The analog phase loop can be eliminated with asynchronous sampling. In this specification, the term "asynchronous sampling" means "nonsynchronous sampling". It should also be appreciated that asynchronous sampling occurs in a time-independent manner of the synchronous rate.

Suppose a given waveform $f(t)$ is asynchronously sampled to produce a train of equally-space-apart sample amplitudes $S_1, S_2, S_3, \ldots, S_j, S_k, \ldots, S_n$. Further, suppose it was desired to linearly interpolate a value I at some distance h between successive samples $S_1$ and $S_2$. Conceptually, a straight line would be extended between the ordinal values of $S_1$ and $S_2$. The value of I is the ordinal value intersecting the straight line at distance h along the abscissa from $S_1$ toward $S_2$. Algebraically, if the distance between $S_1$ and $S_2$ is taken as unity, then generally $I = hS_1 + (1-h)S_2$.

Melas et al., "An Asynchronous Fully Digital Channel for Magnetic Recording", *IEEE Globecom Conference Record*, 1994, pp. 1144–1147, described a linear interpolator employing the above principles. In Melas' channel application, synchronous sample magnitudes {I} and their distances {h} to asynchronous samples are computed. In Melas'system, the synchronous sample amplitude I is interpolated from a pair $S_f$ and $S_2$ of asynchronous samples and then fed to a timing evaluator. The timing evaluator then sends back the next value of h. In this regard, h is the distance between I and $S_1$ and $I = hS_1 + (1-h)S_2$.

If a waveform is not linear between asynchronous samples, linear interpolation error could be significant. This derives from the fact that the interpolated value is a function of the sampled magnitudes. Thus, any results obtained by circuits which process the train of sample and interpolated values will be in error by the difference between the waveform magnitude and the ordinal value intersecting the straight line connecting the two samples at any given point in time. One prior art solution was to increase the sampling rate. However, increasing the sample rate also affects many aspects of the physical design, including increased circuit complexity, cost and adverse performance.

SUMMARY OF THE INVENTION

It is an object of this invention to devise a method and apparatus for recovering digital waveform information via asynchronous signal sampling of waveforms as received from communication channels, tracked magnetic or optical storage devices, or the like.

It is a related object that such method and apparatus utilize the interpolation of signals between the asynchronously sampled signals at predetermined points in order to facilitate low sampling rates while still effectuating synchronous digital detection.

It is yet another object that said method and apparatus reduce computational and control complex in the readback channel of a tracked recording device or the like.

These objects are attained in a sample amplitude channel according to the invention. In this channel, a sequence of samples $S_j, S_k, \ldots$ are asynchronously obtained from a waveform, the waveform having been impressed with synchronous information. Next, midpoint values $J_j$ are interpolated between each predecessor $S_j$ and successor sample $S_k$ by a first filter, each midpoint value being a weighted average of the counterpart predecessor and successor samples. The sequence is modified to appear as $S_1\ J_1\ S_2\ J_2\ S_3\ J_3\ldots$. This is followed by linearly interpolating estimates V of coded values at predicted synchronous points in the modified sequence $\ldots, S_j, J_j, S_k$ by a second filter. Relatedly, each $V_j$ estimate of a coded value is a weighted average of a sample and a midpoint value as, for instance, one of the ordered pairs $(S_j, J_j)$ or $(J_j, S_k)$ bounding a predicted synchronous point. Lastly, a phase-lock timing generator responsive to the sample sequence $S_1, S_2, S_3, \ldots, S_j, S_k, \ldots$ and to the linearly interpolated modified sequence such as $\ldots, S_1, J_1, V_1, S_2, J_2, V_2, S_3, J_3, S_4, V_4, J_4, \ldots$ generates indicia of the predicted synchronous points and applies the indicia to the second filter.

In the asynchronously sampled read channel, the phase-lock timing loop includes circuits for ascertaining a fractional time displacement h between the occurrence of each sampled value $S_j$ of those successive ordered pairs either $(S_j, J_j)$ or $(J_j, S_k)$, of the modified sequence bounding a predicted synchronous point. This displacement h is measured from the counterpart sample $S_j$ toward $S_k$. The second filter is responsive to the displacement h, and further includes circuits for interpolating each estimate $V_j$ in the modified sequence. In the event that h<0.5, then the predicted synch or insertion point for V is taken to be at a distance h'=2h from $S_j$ toward $J_j$. However, in the event that h≥0.5, then the predicted synch or insertion point for V is taken to be at a distance h'=2h−1 from $J_j$ toward $S_k$. When the value of h={0.0, 0.5, or 1.0}, then the predicted synch or insertion point is the same as the sampled point. This means that the sample value taken at that point is the coded value so the linear interpolation can be suspended for those points when they occur.

It should be noted that the doubly interpolated, sampled sequence provided by the method and apparatus of this invention is then applied to a sequential detector appropriate for the original form of modulation. If the values {A, 0, or −A} were the ones originally coded on a partial-response type 4 waveform and recorded, then on readback, the sequence as processed by this invention would be applied to a sequential detector of maximum likelihood (Viterbi) type.

BRIEF DESCRIPTION OF THE DRAWING

FIG. 4 sets out a partial-response coded analog waveform with asynchronous sampling and two levels of interpolation being superimposed thereon according to the invention.

DESCRIPTION OF THE PREFERRED EMBODIMENT

It should be appreciated that this invention pertains wherever coded analog signals are asynchronously sampled. This includes communications systems and information recording and storage systems. In the following paragraphs, a disk storage device is described as a host for the invention. This is merely illustrative and should not be construed as limiting.

Figure 1:
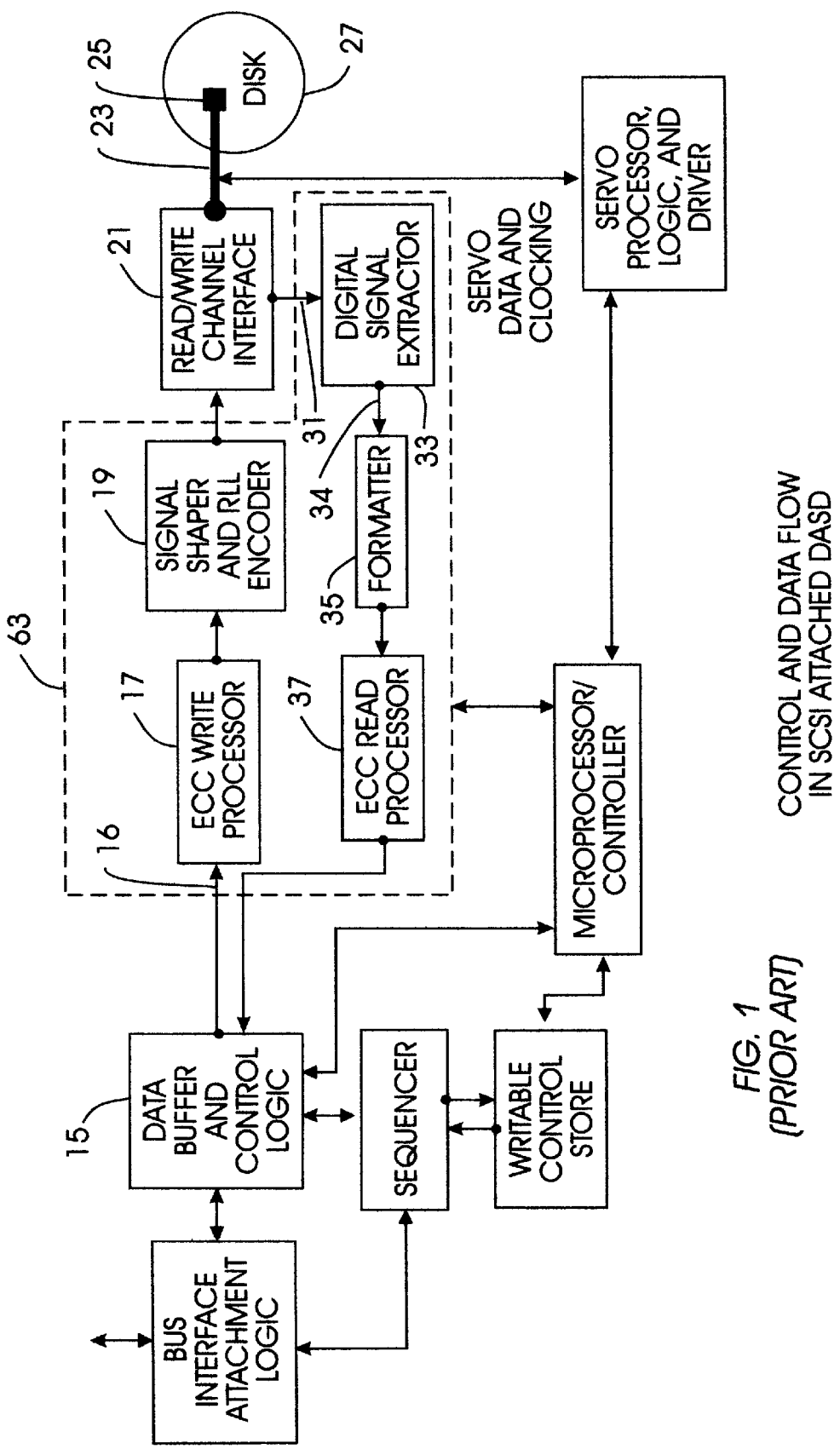
FIG. 1 depicts a partial control and data flow for a cyclic, multitracked disk storage device according to the prior art and having a read channel for sampling the readback signal from the disk drive.

Referring now to FIG. 1, there is depicted a partial control and data flow for a cyclic, multitracked disk storage device according to the prior art. Relatedly, the preferred embodiment of this invention is sited in the channel electronics portion 63 of this device. Briefly, when data is to be written on a cyclic, multitracked disk 27, a write command including an address is streamed across the device attachment interface. An access path to the disk tracks of interest is processed by a control path including a sequencer, a control processor, and a servo processor and logic. These cause a head-disk arm (HDA) assembly to be moved to the target track. Concurrently, data is streamed across the interface and temporarily stored in a circular or double buffer 15.

The device controller coordinates moving the data out from the buffer 15 through a write path portion of the channel electronics 63 for recording on the track via signals applied to head 25. The data in the form of a binary stream of 1's and 0's is mapped into codewords of either a block error correction code or into a convolutional code such as that of a partial-response 4 by an encoder 17. It may further be mapped into a run-length-limited code for channel spectral shaping purposes by another shaper and encoder 19, or it may be applied directly to the head. Significantly, the coded analog signals are applied to the head 25 over path 23 and recorded at a predetermined rate.

Suppose an analog signal is amplitude encoded with the values A, 0, −A. That is, the points in time when the signal magnitude assumes one of the three values are the points of sampling interest when the signal is read back and the coding is to be recovered. The rate at which these coding points are recorded is termed the writing rate or synchronization rate.

When data is to be recovered from a given disk track, the HDA is positioned and the data streamed from the head through the channel interface 21 and applied to digital signal extractor 33. Extractor 33 converts the analog waveform on path 31 to a series of coded sequences. These coded sequences are passed to a formatter 35 over path 34 and an ECC decoder 37 where they are mapped over to counterpart 1's and 0's of the original data binary stream and placed in buffer 15 for transfer across the interface in response to a read request.

Figure 2:
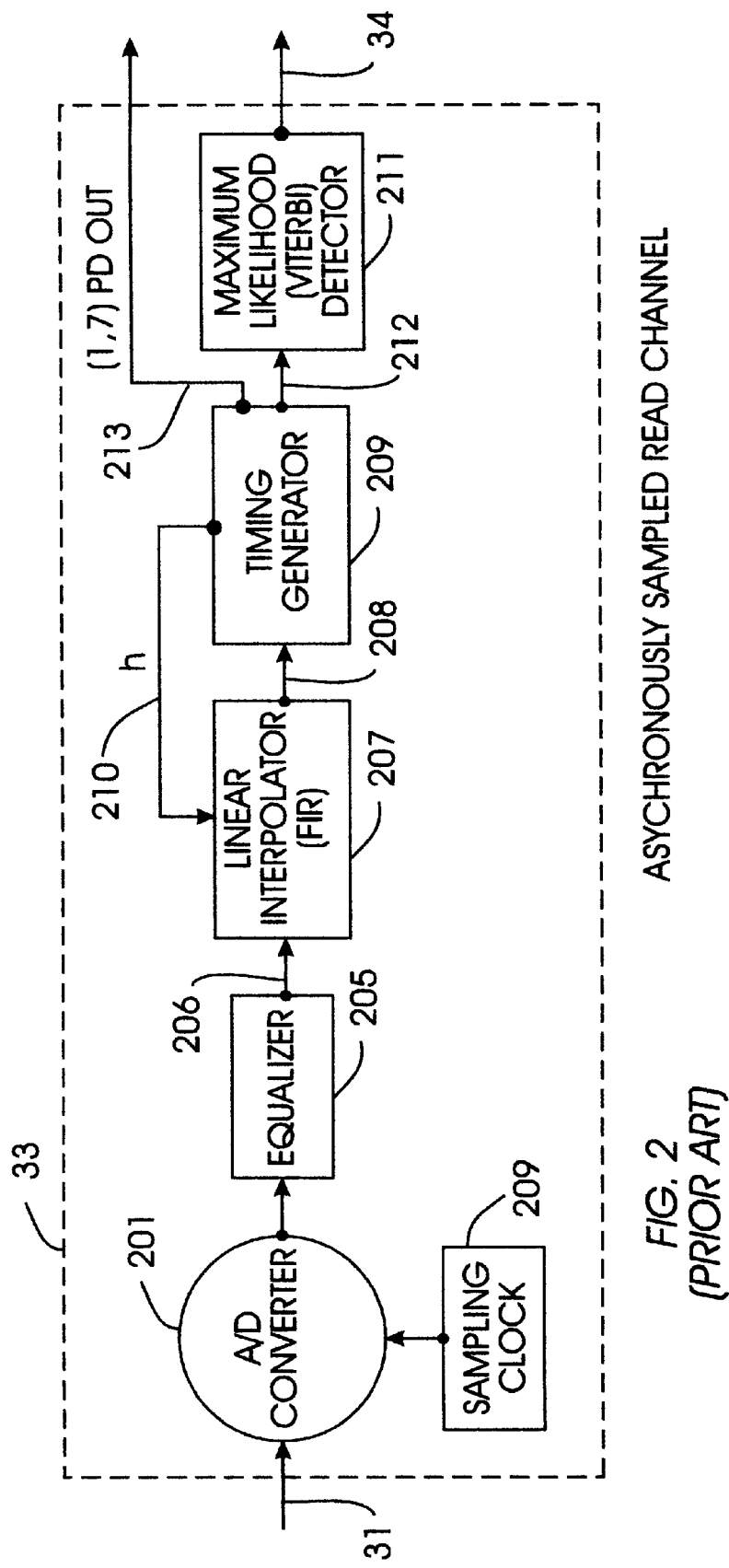
FIG. 2 shows the block level flow of a digital signal extractor implementing a part of a prior art asynchronous sampling read channel.

Referring now to FIG. 2, there is shown the block level flow of a digital signal extractor 33 implementing a part of a prior art asynchronous sampling read channel as depicted in FIG. 2 of the aforementioned Melas publication. An analog signal or waveform read back from the disk track on path 31 is applied to analog-to-digital converter 201. This converter is sampled by a sampling clock 203 at a rate higher than the synchronous or writing rate. The sampled values are passed through an equalizer 205. The equalizer 205 can be a finite impulse response filter (FIR) or the like. The equalized sample signals $S_1, S_2, \ldots, S_n$ are then applied to a linear interpolator 207. The interpolator 207 output drives a timing loop formed from a linear interpolator 207 and a timing generator 209. In this configuration, the linear interpolator 207 supplies value I to the timing generator 209. The latter computes a time displacement parameter h and feeds h back to the interpolator 207 over path 210.

In the embodiment of FIG. 2, the linear interpolator 207 ascertains the amplitude of the value I to be inserted as a weighted function of at least two asynchronous samples S and of the displacement parameter h. Restated in mathematical terms, $I=f(h, S_1, S_2, \ldots, S_n)$. In this regard, h is the time between the interpolated value I and the nearest asynchronous sample. If the interpolation is linear, then I may be expressed as $I=S_1+h(S_2-S_1)$.

In this prior art embodiment, the timing generator 209 estimates the position of the next interpolated value I from two or more prior interpolated values and the time or displacement h from that position to the nearest asynchronous sample S.

Figure 3:
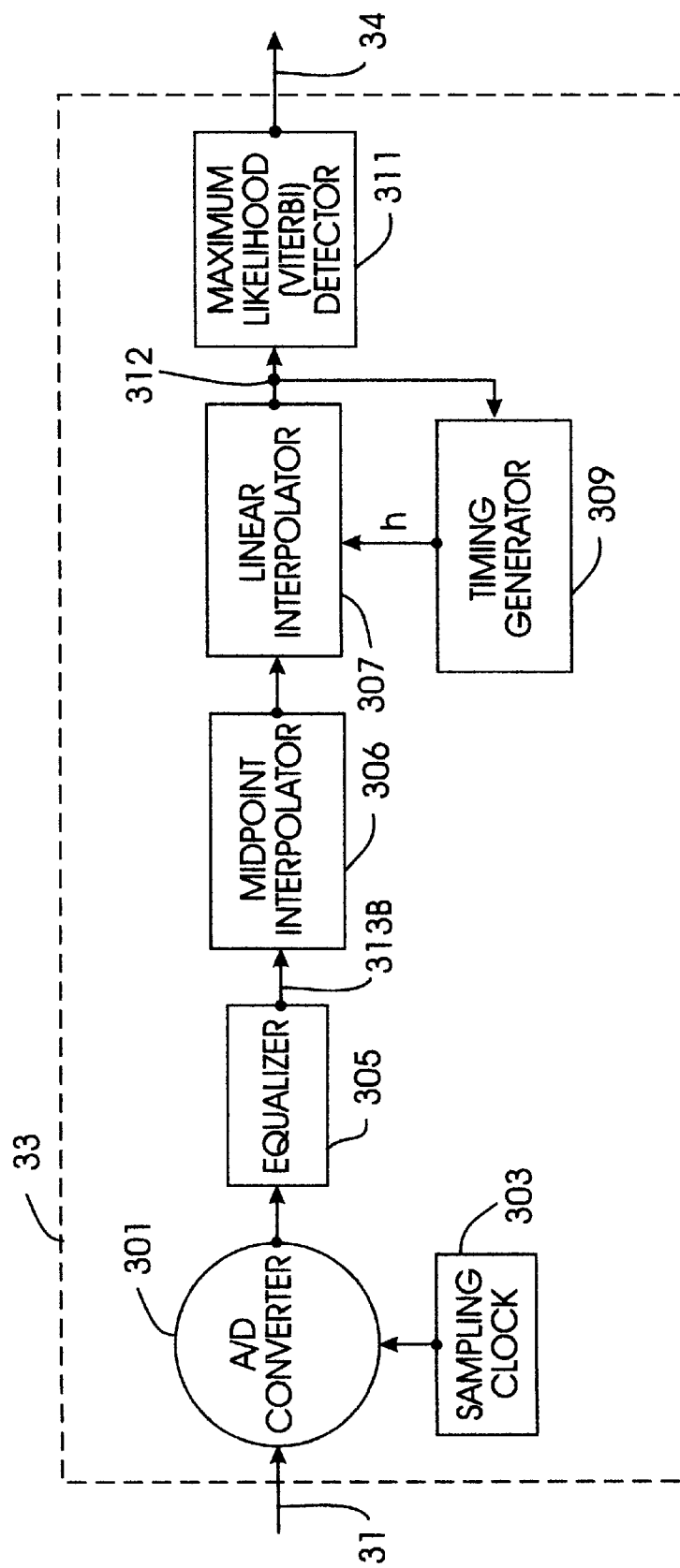
FIG. 3 shows a block level flow of an asynchronous sampling read channel according to the invention.

Referring now to FIG. 3, there is shown a block level flow of an asynchronous sampling read channel according to the invention. Typically, an analog signal is encoded as a partial-response type 4 signal and recorded on a disk or other tracked storage medium at a synchronous rate $\omega$. At a subsequent time, the recorded signal is read back over path 31 applied to an analog-to-digital converter 301. Here, it is sampled by clock 303 asynchronously at a rate $\theta > \omega$ in the range $1.0\omega < \theta < 1.3\omega$. Preferably, the sampling rate $\theta$ should be no more than 5 to 10 percent of the synchronous rate $\omega$. The samples are then applied to an equalizer 305 where adjustments are made in the amplitude and phase relations among the sample signal components to compensate for any undue attenuation or time delays. The equalizer 305 is preferably implemented in the form of an FIR or transversal filter. The equalized samples $S_1, S_2, \ldots S_j, S_k, \ldots$ are then applied sequentially to a midpoint interpolator 306. The sequence, including the midpoint values, is then applied to a linear interpolator 307. The output of the linear interpolator 307 is concurrently applied to a detector 311 and is fed back over path 312 to a timing generator 309.

As will be described subsequently, the midpoint interpolator 306 ascertains a weighted sum $J_j$ from each preceding $S_j$ and succeeding sample $S_k$ and inserts (intepolates) $J_j$ at a midpoint there between. This can be symbolically expressed in a modified sequence as $S_1, J_1, S_2, J_2, S_3, \ldots$. The midpoint interpolator 306 can also be convenienty implemented as an FIR or transversal filter. The linear interpolator 307 and the timing generator 309 operate so as to estimate values V that would occur at predicted synchronous points as a function of the samples S, the midpoint values J, and an estimated displacement h.

The midpoint interpolation coefficients are pairwise identical. Thus, for a six-tap FIR, only three different coefficients are used. This symmetry substantially reduces signal processing complexity. Illustratively, for a six-tap FIR, the midpoint sample J halfway between $S_3$ and $S_4$ could be expressed as:

$$J=0.05S_1-0.15S_2+0.6S_3+0.6S_4-0.15S_5+0.05S_6.$$

The midpoint interpolator FIR filter coefficients are those of a Kaiser-windowed (beta=3) type II low-pass filter. This FIR-windowed, low-pass filter is of a type described by Oppenheim et al., "Discrete Time Signal Processing", *Prentice Hall, Inc.,* 1989, at page 258. The Kaiser window is described at page 452 of this reference.

Referring now to FIG. 4 when taken together with FIG. 3, there is shown a partial-response coded analog waveform (PR type 4) with asynchronous sampling and two levels of interpolation being superimposed thereon according to the invention. The waveform is depicted as a dashed amplitude varying line over time. It would be applied to the A/D converter 301 via path 31. The waveform constitutes a continuous function nominally in the amplitude range between +1 and −1. This range is depicted as the ordinate on the left-hand side of the figure.

In FIG. 4, the asynchronous samples are set out as labeled ordinal points $S_1, S_2, S_3, \ldots$, as are the midpoint values $J_1, J_2, J_3, \ldots$. In the PR4 waveform, the coding events of interest occur when the waveform amplitude assumes either a +1, 0, or −1 value. These coding events or values are labeled $V_1, V_2, V_3, \ldots$ dashed ordinal lines spaced apart approximately $1/\omega$ units of time on the abscissa. Relatedly, the asynchronous samples $S_1, S_2, S_3$, are space apart approximately $1/\theta$ time units. Since $\theta \approx 1.1\omega$, then on the timeline in FIG. 4, $1/\theta \approx 0.90/\omega$. This means that there should be a greater number of asynchronous samples S than synchronous values V.

It should be noted that the interpolated values $J_1, J_2, J_3, \ldots$ are placed at midpoint between two successive asynchronous samples $S_1$ and $S_2$. They form a modified sequence $S_1, J_1, S_2, J_2, S_3, J_3, \ldots$. Significantly, the midpoint interpolator 306 uses an estimator of the form $J=0.05S_1-0.15S_2+0.6S_3+0.6S_4-0.15S_5+0.05S_6$.

The method of the invention comprises the steps of (a) obtaining asynchronous sample values S; (b) deriving the midpoint values J between and from each two consecutive sample S values; and (c) ascertaining the point or location of an estimated coded value V between a sample value S and its contiguous midpoint value J by linear interpolation.

In FIG. 4, the vertical grid values V are the "actual values" to be estimated (interpolated) after the midpoint interpolation. This means that only those pairs of S and J values bounding a vertical dashed line V are of interest. These are either of the form $S_j, V_j, J_k$ or $J_k, V_j, S_k$ and only where $V_j$ assumes one of the three values +1, 0, or −1.

More generally, given an amplitude-coded analog waveform, if the waveform were ideally sampled, then time occurrences of the coded values V={1, 0, and −1} could be linearly interpolated from a series of asynchronous samples occurring at or near the writing rate. First, midpoint values J occurring between each two successive samples $S_1, S_2$ would be determined. Second, the location (synchronous point) between those pairs of S and J bounding where V is expected to assume any one of the three values 1, 0, or −1 must be estimated.

Referring again to FIG. 4 when taken together with FIG. 3, three pieces of information are required for the linear interpolation of the estimated values V at the predicted synchronization points. These are the amplitude of the asynchronous sample S, the amplitude of the midpoint value J, and a displacement h in the range $0 \leq h \leq 1$.

The parameter h represent the relative (fractional) time distance from the $S_j$, to $V_j$ between $S_j$ and $S_k$. In FIG. 4, $V_1$ occurs between $S_1$ and $S_2$ for an h=0.95. Likewise, $V_2$ occurs between $S_3$ and $S_4$ for an h=0.05. Similarly, $V_3$ occurs between $S_4$ and $S_5$ where h=0.10, etc. The pattern of variation of h over successive samples in FIG. 4 is set out in the following table:

| Predicted Synch Point for V | V Occurring Between Asynch Samples $S_j$ and $S_k$ | Parameter h |
|---|---|---|
| $V_1$ | $S_1\ S_2$ | 0.95 |
| $V_2$ | $S_3\ S_4$ | 0.05 |
| $V_3$ | $S_4\ S_5$ | 0.10 |
| $V_4$ | $S_5\ S_6$ | 0.20 |
| $V_5$ | $S_6\ S_7$ | 0.40 |
| $V_6$ | $S_7\ S_8$ | 0.50 |
| $V_7$ | $S_8\ S_9$ | 0.60 |
| $V_8$ | $S_9\ S_{10}$ | 0.75 |
| $V_9$ | $S_{10}\ S_{11}$ | 0.90 |
| $V_{10}$ | $S_{11}\ S_{12}$ | 0.95 |
| $V_{11}$ | $S_{13}$ | 1.00 |

As may be apparent, the parameter h is a function of asynchronous samples S and is determined by a timing algorithm. A timing algorithm in principle seek to derive distance along the time axis or abscissa from some reference point such as a first sample to some intermediate point as a function of the amplitudes of a first and second sample. Consider a waveform, such as a sine wave, that is known to continuously vary in amplitude between +1 and −1. If this sine wave were sampled at slightly higher than the synchronous rate, then the difference in sample values would provide some indications of the time or phase position of the samples relative to the sine waveform. If $S_1-S_2=0$, then both samples are being symmetrically taken at 45 and 135 degrees or at 225 and 315 degrees. If $S_1-S_2=+1$, then the samples are being taken at 90 and 180 degrees. Similarly, if $S_1-S_2=-1$, then the samples are being taken at 0 and 90 degrees or at 270 and 360 degrees. Given that $S_1-S_2=0.707$, it should then be straightforward to estimate the distance from $S_1$ to the nearest synchronization point in the direction between $S_1$ and $S_2$.

From the table and FIG. 4, it may be observed that over a succession of $S_j\ S_k$ intervals, the h values gradually increase discretely from 0.0, 0., 0.3, 0.5, 0.8, 1.0, . . . . Thus, when h=0, then no interpolation is needed since the sample value is the estimated synchronous value or V=S. Also, when h=0.5, then no interpolation is needed since the value is V=J. Restated, interpolation is not needed for h={0.0, 0.5, and 1.0}.

As previously mentioned, each synchronization point is bounded either by an (S, J) or a (J, S) ordered pair. It also follows from the table and FIG. 4 that if h>0.5, then the bounding pair is (J, S); whereas if h<0.5, the bounding pair is (S, J).

The question arises as to whether there exists an interpolated value V for every asynchronous sample interval $S_j, S_k$. The answer is clearly in the negative. Since the asynchronous sampling rate $\theta > \omega$, then some of the synchronous points $V_j$ will not lie between an asynchronous point S and a midpoint J. This means that if $\theta/\omega=11/10$, then the algorithm for generating h would be modified to include a provision for suspending an output h on every eleventh asynchronous sample.

It should be emphasized that the method and apparatus of the invention permit asynchronous sampling at near synchronous (write rate) by increasing the number of asynchronous samples for synchronous detection purposes through interpolating synchronous points. It should also be emphasized that the parameter h is a fractional number between 0 and 1. It is the distance between asynchronous sample S and nearest synchronized sample V relative to the distance between two successive samples S. However, if h=0.1 between two asynchronous samples $S_j$ and $S_j+1$ and if there is a midpoint value J there between, then the value h' representing that distance is actually doubled. That is, the value applied to or used by the linear interpolator is h'=2h. Restated, the linear interpolator 307 as driven by the midpoint interpolator 306 must operate as if the h' value applied to it were 2*h, where h is determined by timing generator 309.

The h values are always measured from an asynchronous point S. The predicted insertion point for V is at h'=2h. Where h>0.5 and h'>1.0, then the insertion point for V does not fall between the $S_j$ and $J_j$. Rather, it falls between $J_j$ and $S_k$. Thus, for h>0.5, then h'=2h-1 and the insertion point V is measured from the midpoint J value.

Referring again to FIG. 3, the linear interpolator 306 can be implemented to include an FIR filter. Once the value of h is provided by the timing generator 309, then the interpolation point can be ascertained and the synchronous value estimated by a weighted valuation of the bounding S and J magnitudes While the invention has been described with respect to an illustrative embodiment thereof it will be understood that various changes may be made in the method and means herein described without daparting from the scope and teaching of the invention.

Accordingly, the described embodiment is to be considered merely exemplary and the invention is not to be limited except as specified in the attached claims.

What is claimed is:

1. A sample amplitude channel for reading coded values modulating an analog waveform and recorded at a synchronous rate on a tracked magnetic storage device comprising:

an arrangement for generating a sequence of equalized waveform samples $S_j$, $S_k$, ... asynchronously from said storage device;

a first filter responsive to said waveform samples for interpolating midpoint values $J_j$ between each predecessor $S_j$ and successor sample $S_k$ and providing a sample sequence modified with the midpoint values, each midpoint value being a weighted average of the counterpart predecessor and successor samples;

a second filter responsive to the modified sequence ..., $S_j$, $J_j$, ... for linearly interpolating estimates V of coded values at predicted synchronous points, each estimate of a coded value being a weighted average of a sample and a midpoint value as, for instance, one of the ordered pairs ($S_j$, $J_j$) or ($J_j$, $S_k$), bounding a predicted synchronous point; and a timing generator responsive to the linearly interpolated modified sequence for general indicia of the predicted synchronous point and applying said indicia to the second filter.

2. The channel according to claim 1, wherein the arrangement for generating a sequence of equalized waveform samples includes a mechanism for converting the recorded waveform into an analog electric signal, an asynchronous sampling clock, and a logic device coupling said clock and responsive to the signal for generating the sequence of sample values at the clock rate.

3. The channel according to claim 1, wherein said timing generator includes circuits for ascertaining a fractional time displacement h between the occurrence of each sampled value $S_j$ of those successive ordered pairs, either ($S_j$, $J_j$) or ($J_j$, $S_k$), of the modified sequence bounding a predicted synchronous point as measured from the counterpart sample $S_j$ toward $S_k$, and wherein said second filter includes circuits for interpolating each estimate $V_j$ in the modified sequence either at a distance h'=2h from $S_j$ toward $J_j$ where h<0.5 or at a distance h'=2h-1 from $J_j$ toward $S_k$ where h≧0.5, and for applying said aperiodic sequence to a detector.

4. A method for recovery of coded information (A, 0, -A) modulating an analog signal $f(t)$, said signal being recorded at a predetermined or synchronous rate ω onto a tracked storage medium and played back over a read channel, said method including the steps of:

(a) sampling and equalizing $f(t)$ at a rate θ producing a sequence of samples $S_1$, $S_2$, ..., $S_j$, $S_k$, ...;

(b) forming a sequence of estimated magnitudes $J_1$, $J_2$, ..., where each $J_j$ is a weighted sum of two successive samples $S_j$ and $S_j+1$, and interpolating said values $J_1$, $J_2$, ... into the sequence as midpoint values $S_1$, $J_1$, $S_2$, $J_2$, ...;

(c) ascertaining a fractional time displacement h between the occurrence of each sampled value $S_j$ of those successive ordered pairs, either ($S_j$, $J_j$) or ($J_1$, $S_k$), of the interpolated sequence bounding an estimated synchronous point as measured from the counterpart sample $S_j$ toward $S_k$; and (d) forming a sequence of estimated magnitudes $V_1$, $V_2$, ..., where each $V_j$ is a weighted sum of either $S_j$ and $J_j$ or $J_j$ and $S_k$ for each ordered pair bounding a counterpart estimated synchronous point, inserting each estimated magnitude $V_j$ either at a distance h'=2h from $S_j$ toward $J_j$ where h<0.5 or at a distance h=2h-1 from $J_j$ toward $S_k$ where h≧0.5 expressing an aperiodic sequence of the form S, J, V, S, V, J, V, S, V, J, V, S, and applying said aperiodic sequence to a detector.

5. The method according to claim 4, wherein the modulation code is one selected from a set consisting of convolutional codes, trellis codes, partial-response class 4 codes, and run-lenght-limited codes.

6. The method according to claim 4, wherein the sampling rate θ lies in the range 1.00ω≦θ≦1.30ω.

7. The method according to claim 4, wherein step (d) further comprises the step of suspending insertion of any estimated value $V_j$ in the sequence S, J, S, J, ... either between the bounding pair ($S_j$, $J_j$) or ($J_j$, $S_k$) upon the condition that $h_j$={0.0, 0.5, or 1.0}.

8. The method according to claim 4, wherein the modulation code is of the partial-response type, and further wherein the coded values at any synchronous point assume one magnitude value from a set of values consisting of A, 0, and -A, where |A| is a predetermined magnitude.

9. A method for processing coded information modulating an analog signal recorded on a tracked storage medium at a predetermined or synchronous rate ω, comprising the steps of:

(a) asynchronously sampling the analog signal at a rate θ and generating a sequence of sample values $S_1$, $S_2$, ...;

(b) interpolating midpoint values $J_1$, $J_2$, ... into he sequence of sample values, each midpoint value $J_j$ being a weighted sum of a counterpart predecessor $S_j$ and successor $S_k$ sample values, the interpolation yielding a modified sequence $S_1$, $J_1$, $S_2$, $J_2$, $S_3$, ...;

(c) interpolating additional values $V_j$, $V_k$, ... at estimated synchronous points in the modified sequence, the points being bounded by counterpart ordered pairs ($S_j$, $J_j$) or ($J_j$, $S_k$), each synchronous point being estimated as a relative distance h' from either the occurrence of a sample value $S_j$ or a midpoint value $J_j$, where h' is a function of displacement h, where h is the fractional estimated of any synchronous point in the interval $S_j$ to $S_k$ and wherein $0 \geq h \geq 1$, such that for $h<0.5$, $h'=2h$ in the $S_j$ to $J_j$ direction, $V_j$ being a weighted sum of $S_j$ and $J_j$, and such that for $h \geq 0.5$, $h'=2h-1$ in the $J_j$ to $S_j+1$ direction, $V_j$ being the weighted sum of $J_j$ and $S_j+1$; and (d) applying sequence S interpolated with both midpoint values J and additional values V expressing an aperiodic sequence of the form SJSVJSJVS . . . to a sequential detector.

10. A method for recovery of information (A, 0, −A) coded onto an analog signal $f(t)$ and recorded at a predetermined or synchronous rate ω onto a tracked storage medium and played back over a read channel, said method comprising the steps of:

(a) sampling and equalizing $f(t)$ at a rate θ producing a sequence of samples $S_1, S_2, \ldots, S_j, S_k, \ldots$;

(b) deriving values J as a midpoint weighted sum located between successive samples $S_1, S_2, \ldots, S_j, S_k, \ldots$, such that $J_1=aS_k+(1-a)S_j$, where the coefficient "a" lies in the range $0 \leq a \leq 1$, and interpolating the values J into a sequence of the form $S_1, J_1, S_2, J_2, S_3, \ldots$;

(c) ascertaining a fractional distance $h_j$ between time occurrences 1/jθ of successive samples $S_j$, $S_k$ of those pairs $(S_j, J_j)$ or $(J_j, S_k)$ bounding a synchronous point 1/nω, each $h_j$ being measured from its counterpart sample $S_j$; and (d) determining an insertion point h' for an estimated synchronous value $V_j=\{A, 0, -A\}$ between a bounding (S, J) or (J, S) pair either at a distance $h_j=2h_j$ from $S_j$ toward $J_j$ where $h_j<0.5$ or at a distance $h_j'=2h_j-1$ from $J_j$ toward $S_k$ where $h_j \geq 0.5$, interpolating the values V into an aperiodic sequence of the form S, J, V, S, V, J, V, S, V, J, V, S, and applying said aperiodic sequence to a detector.

11. An article of manufacture comprising a machine-readable memory having stored therein a plurality of processor-executable control program steps for reading coded values modulating an analog waveform and recorded at a synchronous rate on a stked magnetic storage device, aid control program steps include:

(a) a control program step for generating a sequence of equalized waveform samples $S_j, S_k, \ldots$ asynchronously from said storage device;

(b) a control program step responsive to said waveform samples for interpolating midpoint values $J_j$ between each predecessor $S_j$ and successor sample $S_k$ and for providing a sample sequence modified with the midpoint values, each midpoint value being a weighted average of the counterpart predecessor and successor samples;

(c) a control program step responsive to the modified sequence . . . , $S_j, J_j, S_k, \ldots$ for linearly interpolating estimates V of coded values at predicted synchronous points, each estimate of a coded value being a weighted average of a sample and a midpoint value as, for instance, one of the ordered pairs $(S_j, J_j)$ or $(J_j, S_k)$, bounding a predicted synchronous point; and (d) a control program step responsive to the sample sequence and to the linearly interpolated, modified sequence for generating indicia of the predicted synchronous points and applying said indicia to the second filter.

* * * * *